United States Patent [19]

Hayashi et al.

[11] Patent Number: 4,679,150

[45] Date of Patent: Jul. 7, 1987

[54] AUTOMATIC VENDING MACHINE WITH DISCOUNT FUNCTION

[75] Inventors: Yukichi Hayashi; Eiji Itako, both of Sakado; Masahiro Yasuhara, Saitama, all of Japan

[73] Assignee: Kabushiki Kaisha Nipponcoinco, Tokyo, Japan

[21] Appl. No.: 709,040

[22] Filed: Mar. 7, 1985

[30] Foreign Application Priority Data

Apr. 17, 1984 [JP] Japan ............................ 59-75748

[51] Int. Cl.⁴ .................. G06F 15/20; G07F 5/02; G07F 5/00
[52] U.S. Cl. .............................. 364/479; 364/464; 194/217; 194/218
[58] Field of Search .................. 194/217, 218; 221/1, 221/17, 18; 133/1 R, 2; 340/825.35; 364/464, 479, 200, 900

[56] References Cited

U.S. PATENT DOCUMENTS

| | | | |
|---|---|---|---|
| 3,815,720 | 6/1974 | Machanian et al. | 194/217 |
| 4,008,792 | 2/1977 | Levasseur et al. | 194/217 |
| 4,316,532 | 2/1982 | Levasseur | 194/217 |
| 4,392,564 | 7/1983 | Hayashi | 194/218 |
| 4,446,528 | 5/1984 | Marmon | 364/464 X |
| 4,498,570 | 2/1985 | King et al. | 194/217 |
| 4,499,982 | 2/1985 | Suginoto et al. | 194/217 |
| 4,499,985 | 2/1985 | Schuller | 194/217 |

*Primary Examiner*—Jerry Smith
*Assistant Examiner*—Jon D. Grossman
*Attorney, Agent, or Firm*—Koda & Androlia

[57] ABSTRACT

An automatic vending machine is provided which has a continuous sale controller for continuously selling a plurality of products within a total amount of coins inserted therein for a single purchase. Until the outstanding balance becomes zero single sale operations are stored in a single sale operation memory. When a count of a counter reaches a reference number while the single sale operations are being stored, a reference number detector generates an output. The regular sales price supplied from a product sales price generator to the continuous sale controller is updated to a discount price when an output is generated from the reference number detector.

6 Claims, 4 Drawing Figures

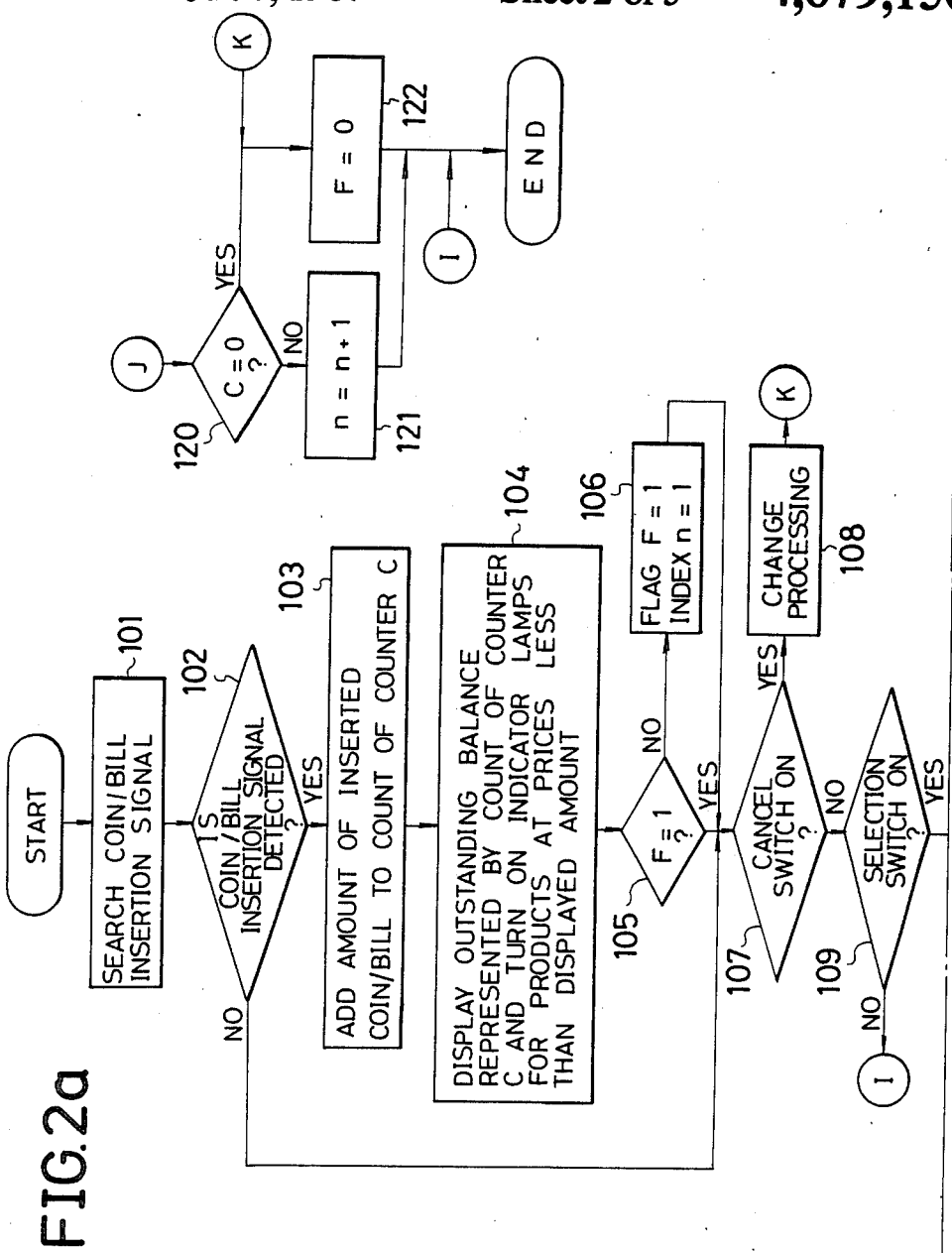

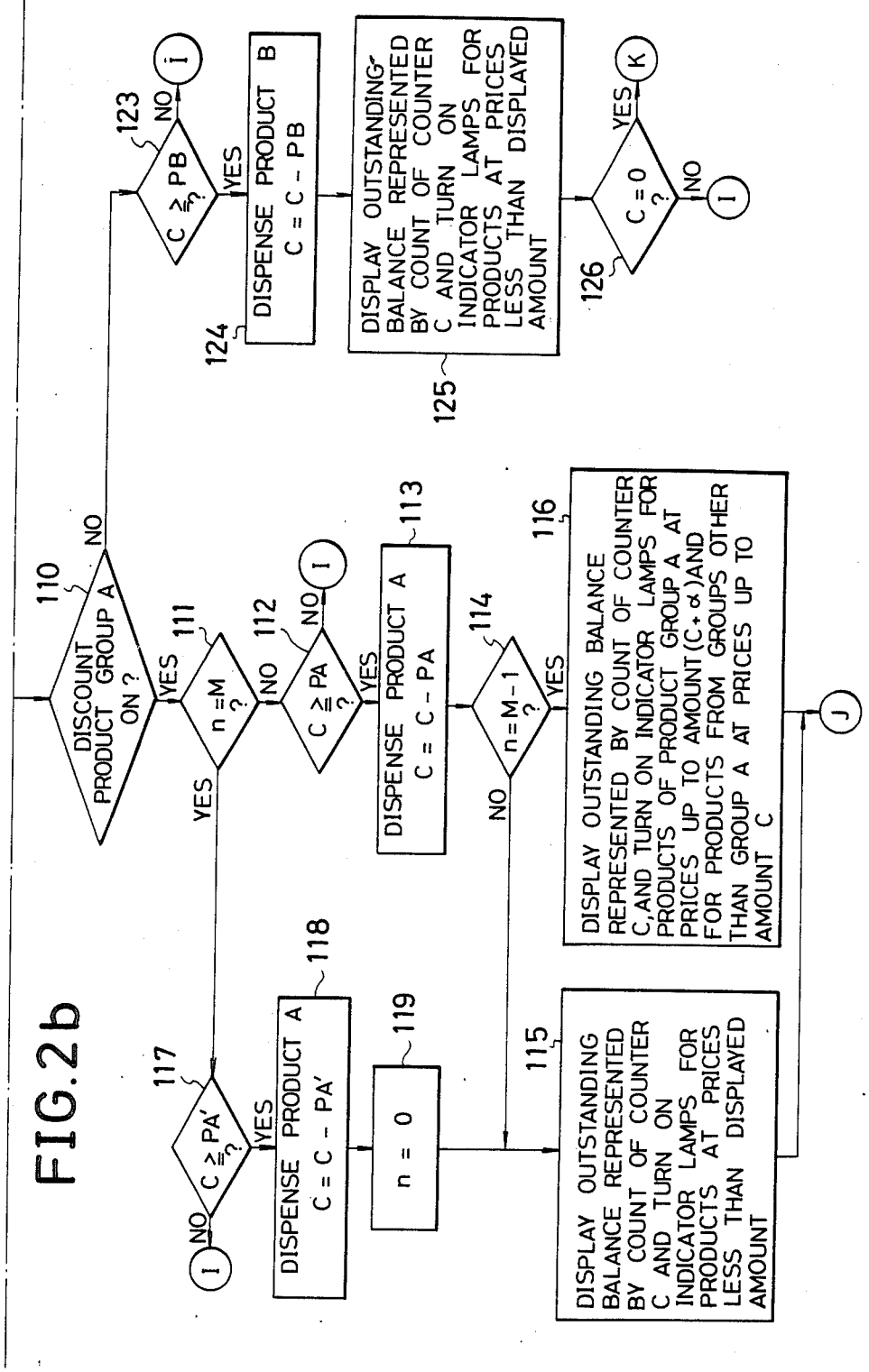

AUTOMATIC VENDING MACHINE WITH DISCOUNT FUNCTION

BACKGROUND OF THE INVENTION

1. Field of the Invention

The present invention relates to an automatic vending machine and, more particularly, to an automatic vending machine for performing discount sales so as to sell a plurality of products within the amount of a coin or coins inserted for a single purchase.

2. Description of the Prior Art

Among conventional automatic vending machines for continuously selling a plurality of products within the amount of a coin or coins inserted for a single purchase, a conventional automatic vending machine is described in Japanese patent publication No. 54-42799 wherein products are discounted by a predetermined amount in accordance with the total amount of a coin or coins inserted for a single purchase. Other conventional automatic vending machines are also described in Japanese patent publication No. 59-2075 and Japanese patent disclosure No. 54-87296, wherein products are discounted by a predetermined amount in accordance with a predetermined number of products to be purchased at a single time.

In a conventional automatic vending machine for performing discount sale of products when the number of products exceeds a predetermined number for each purchase, assume that ¥70 products are discounted by ¥30 when six products are purchased. In this case, when a customer inserts coins for a total amount of 390 (¥70×6−¥30), six products are to be purchased. However, when the customer inserts coins for a total amount of ¥400 so as to purchase six products, an outstanding balance is displayed as ¥50 when the fifth product is purchased. Under this condition, the customer cannot purchase the sixth product, resulting in inconvenience. In a conventional automatic vending machine for performing discount sales of this type, unless coins for the total amount of a nondiscount sale are inserted, products for a discount sale cannot be purchased. Therefore, even if coins amounting to a discount sale amount are inserted, such products cannot be purchased, resulting in inconvenience.

SUMMARY OF THE INVENTION

It is an object of the present invention to resolve the conventional problem described above and to provide an automatic vending machine wherein products can be purchased at a discount price when a plurality of products are purchased within the total amount of a coin or coins inserted for a single purchase and the number of products reaches the discount sale number, so that products up to the number subject to the discount sale can be purchased at the discount price.

According to the present invention, there is provided an automatic vending machine having continuous sale control means for subtracting the price of each product from the total amount of an inserted coin or coins and for continuously selling products while an outstanding balance is larger than the price of each product. The automatic vending machine is characterized as follows. Single sale operation is stored in single sale operation memory means until the outstanding balance becomes zero. The number of sold products is counted by counting means while each single sale operation is stored in the single sale operation memory means. When a count of the counting means reaches a predetermined number, a reference number detecting means generates an output. A product sales price supplied from product sales price output means to the continuous sale control means is updated to a discount price while the output is being generated from the detecting means. When the number of products reaches the discount number, the regular sales price is updated to a discount price. When the discount price is compared with the outstanding balance and the customer can purchase the discount product, a sale enable signal is generated. When the customer actually purchases the discount product, the discount price is subtracted from the balance.

BRIEF DESCRIPTION OF THE DRAWINGS

FIGS. 2, 2A and 2B are a flow chart for explaining the operation executed in the automatic vending machine of FIG. 1.

DETAILED DESCRIPTION OF THE PREFERRED EMBODIMENT

Figure 1:
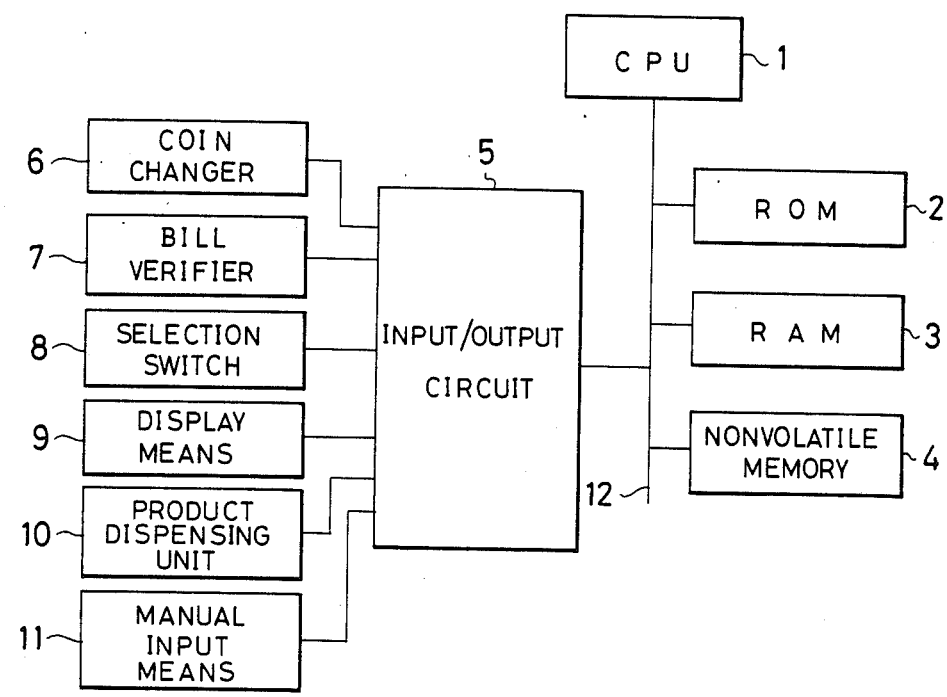
FIG. 1 is a block diagram showing a circuit configuration of an automatic vending machine according to an embodiment of the present invention.

A preferred embodiment of the present invention will be described in detail with reference to the accompanying drawings.

FIG. 1 shows a circuit arrangement of an automatic vending machine according to the embodiment of the present invention. Reference numeral 1 denotes a central processing unit (to be referred to as a CPU hereinafter) for controlling the overall operation of the automatic vending machine; 2, a ROM for storing a control program of the automatic vending machine; 3, a RAM for storing operation results; and 4, a nonvolatile memory for storing a discount number, a discount price, a discount product, and the like (to be described later). The ROM 2, the RAM 3 and the nonvolatile memory 4 are coupled to the CPU 1 through an internal bus 12. Reference numeral 5 denotes an input/output circuit. The CPU 1 is connected through an internal bus 12 and the circuit 5 to a coin changer 6 for discriminating a coin inserted in the automatic vending machine and dispensing change through the input/output circuit 5, a bill verifier 7 for discriminating a bill inserted in the automatic vending machine, selection switches 8 such as product selection switches and a cancel switch, a display means 9 including indicator lamps for all product columns to indicate the sale enable state and a balance display unit for displaying an outstanding balance of a total amount of inserted coins, a product dispensing unit 10 for dispensing products from each product column, and a manual input means 11 for entering a discount number, a discount price or the like.

The operation of the automatic vending machine of this embodiment will be described with reference to the flow chart of FIG. 2.

At the manual input means 11, an operator enters product prices PA and PB, a column for storing products for discount, a discount number M representing the number of products subject to discount sale, an amount α to be discounted from the regular product price, and a discount price PA′ (=PA−α) in the nonvolatile memory 4. The CPU 1 periodically repeats the processing shown in FIG. 2. The CPU 1 checks whether or not a coin/bill insertion signal is generated from the coin changer 6 or the bill verifier 7 through the input/output circuit (step 101). If YES in step 102, the amount of a coin/bill inserted in the automatic vending machine is added to a count of a counter C in the RAM 3 (step 103). An outstanding balance (the total amount in this case) counted by the counter C is displayed on the balance display unit of the display means 9, and the indicator lamps for the columns storing the products having prices lower than the displayed amount are turned on (step 104). The CPU 1 then checks in step 105 whether or not a flag F is set at logic "1". If NO in step 105, the flag F is set to logic "1" and an index n is also set to value "1" (steps 105 and 106). When the CPU 1 determines that the flag F is set to logic "1", single sale operation is performed (to be described in detail later). The flag F thus constitutes a single sale operation memory means for storing a single sale operation. The CPU 1 then checks in steps 107 and 109 whether or not the cancel switch and a product selection switch are turned on. If NO in steps 107 and 109, the flow is ended. In this manner, when the coin/bill insertion signal is detected, the operation from step 102 is repeated. However, if NO in step 102, the operations in steps 102, 103, 104 and 105 are omitted. The CPU 1 then checks whether or not the cancel switch and the product selection switch are turned on (steps 107 and 109). If NO in steps 107 and 109, the operation of this cycle is ended. In other words, the CPU 1 checks the presence/absence of the coil/bill insertion signal and the ON/OFF state of the cancel and product selection switches within the predetermined cycle.

When the cancel switch is depressed and turned on, the CPU 1 supplies an instruction to the coin changer 6 or the bill verifier 7 so as to dispense coins or bills which correspond to an amount stored in the counter C, thereby performing change processing (step 108). Thereafter, the flag F is set to logic "0", and the sale operation is ended (step 122). When the CPU 1 determines that the product selection switch is depressed and turned on, the CPU 1 checks whether or not the ON product selection switch belongs to a product group A (steps 109 and 110). The CPU 1 checks whether or not the column corresponding to the ON product selection switch is the column data which is stored in the nonvolatile memory 4. If YES in step 110, the operation from step 111 is performed. However, when the column stores products B other than those of the product group A, the operation from step 123 is performed. Assume that the discount product group A is selected. The CPU 1 checks whether or not the index n stored in the RAM 3 is equal to the reference number, i.e., the discount number M (e.g., M =6) stored in the nonvolatile memory 4 (step 111). Since the index n is set to 1 initially, the CPU 1 checks whether or not the count of the counter C which represents the amount of an inserted coin or the like is equal to or larger than the price PA of the selected product A (step 112). If YES in step 112, the CPU 1 sends an instruction to the product dispensing unit 10 to dispense the product A, and the price PA of the selected product A is subtracted from the count C. The outstanding balance is stored in the counter C (step 113). However, if NO in step 112, the flow is ended. In this next cycle, the CPU 1 monitors whether or not additional insertion of a coin or the like is made or the cancel switch is turned on. After the product is dispensed in step 113 and the count of the counter C is decremented, the CPU 1 checks whether or not the index n is equal to M−1 (i.e., 5 in this embodiment). Since n=1 is currently established, coincidence between n and M−1 cannot be established. In this case, the amount represented by the count of the counter C is displayed on the balance display unit, and at the same time, the indicator lamps for the products having prices lower than the displayed amount are turned on (step 115). When the count of the counter C is zero (step 120), the flag F is reset to logic "0" (step 122), and the sale operation is ended. However, when the count of the counter C is not set to "0", "1" is added to the index n (step 121). The operations from step 101 are performed in the next cycle. When the discount product group A is selected again, the product A is dispensed, and the price of the product A is subtracted from the count of the counter C. At the same time, the index n is incremented by one. When the index n is equal to M−1 (step 114), i.e., when the discount number M is "6" and the five products are sold and the index n is set to "5", the amount represented by the count of the counter C is displayed on the balance display unit. At the same time, the indicator lamps are turned on for products of product group A at prices up to an amount (C+α) and the indicator lamps are turned on for products from groups other than the group A at prices up to an amount corresponding to the count of the count C. As a result, the case will be exemplified again wherein ¥30 discount is made when six ¥70 products A are purchased. When the customer inserts coins for a total amount of ¥400 and five products A are purchased, ¥50 is stored in the counter C. The balance display unit displays 50. The CPU 1 causes the indicator lamps to turn on for products of the product group A at prices up to the amount of ¥80 (=50+30) and for products from groups other than the group A at prices up to ¥50 (step 116). When the index n is incremented by one (step 121) and reaches the discount number M and the discount product group A is selected again (step 110). Since n =M (step 110), the CPU 1 checks in step 117 whether or not the count of the counter C is equal to or larger than the discount price PA'. If YES in step 117, the selected product A is dispensed, and the discount price PA' is obtained by subtracting the amount α from the regular sales price PA (step 118). At the same time, the index n is reset to "0" (step 119). When the product corresponds to the number for discount sale, it is sold at the discount price, and the outstanding balance represented by the count of the counter C is obtained by subtracting the discount price from the immediately preceding outstanding balance. The updated balance is then displayed on the balance display unit, and the indicator lamps for all the products at prices not more than the display amount are turned on (step 115). The operation from step 115 is performed. In this manner, the CPU 1 is operated together with the RAM 3 to constitute the counting means and also constitutes the reference number detecting means and the product sales price means. The same operation as described above is repeated. Every time the number of products reaches the reference number M, a discount sale is performed. When the customer depresses the cancel switch (step 107), the amount represented by the count of the counter C is dispensed by the change dispensing unit of the coin changer 6. The flag F is then set to logic "0" and the single sale operation is ended.

However, if the product selected in steps 109 and 110 is not included in the discount product group A, the operations from step 123 are performed. In other words, the count of the counter C is compared with the price PB of the selected product B. When the CPU 1 determines that the count of the counter C is larger than the price PB, the product B is dispensed, and the price PB is subtracted from the count of the counter C. The updated balance is stored in the counter C and is displayed on the balance display unit, and at the same time, the indicator lamps are turned on for the products at prices not more than the displayed amount (steps 124 and 125). When the count of the counter C is not "0", this cycle is ended. However, if the CPU 1 determines that the count of the counter C is set to zero, the flag F is reset to logic "0", and single sale operation is ended. It should be noted that additional coins or the like can be inserted during a sale series when the outstanding balance is insufficient. In this case, since the flag F is set to logic "1" (step 105), the index n will not be updated. When the number of sold products reaches the reference number M, a discount sale is made.

In the above embodiment, the products are classified into the discount product group A and the nondiscount product group B. However, products having different prices and stored in the automatic vending machine can be discounted under the same conditions. In this case, steps 110, 123, 124, 125 and 126 are omitted from the flow chart of FIG. 2.

Furthermore, the nonvolatile memory need not be arranged, but the discount number or the like can be stored in the RAM 3. In this case, a backup battery is preferably connected to the RAM 3 to retain the contents thereof during a power failure.

Again, when the discount number M, the amount $\alpha$ and the discount price $PA'$ ($=PA-\alpha$) are programmed in the control program stored in the ROM 2, the nonvolatile memory 4 and the manual input means 11 can be omitted.

In addition, the discount product group A can be further classified into different groups Al, A2,... in accordance with a discount condition (the number M, the amount $\alpha$ or the like).

In this case, in step 110, the CPU 1 checks whether the selected product is included in the nondiscount product group B, or the discount product group A1 or A2,... At the same time, the same operations in steps 111 to 119 must be performed under different discount conditions.

What is claimed is:

1. An automatic vending machine with a discount function, said automatic vending machine being provided with continuous sale control means for subtracting a regular sales price from a total amount of money deposited in the automatic vending machine every time a product is sold and for continuously dispensing a selected product so long as an outstanding balance is larger than the regular sales price, comprising:
    a first determining means for determining whether or not money is depositied in the vending machine;
    a second determining means for determining whether or not the outstanding balance is decreased to zero;
    single sale operation memory means responsive to results of determinations effected by said first and second determining means for storing single sale operations until the outstanding balance is decreased to zero;
    a third determining means for determining whether or not said single sale operation memory means stores the single sale operations;
    means for counting the number of products sold while it is determined by said third determining means that said single sale operation memory means stores single sale operations;
    reference number detecting means for determining whether or not a count of said counting means reaches a predetermined reference number and for generating an output when the predetermined reference number has been reached; and
    product sales price output means for supplying a price output to said continuous sale control means, said price output being changed from a first output indicative of the regular sales price of a product to a second output indicative of a discount price which is obtained by subtracting a predetermined amount from the regular sales price while the output is being generated from said reference number detecting means.

2. A machine according to claim 1, wherein said counting means is reset to zero when a product is sold just after the count thereof reaches the reference number, whereby a product is sold at the discount price every time the count of said counting means reaches the reference number.

3. A machine accourding to claim 2, further comprising:
    means for storing discount products and nondiscount products; and
    means for determining which of the discount and non-discount products is selected;
    wherein said counting means counts the number of discount products alone, and said product sales price output means generates the discount price for only the discount products.

4. A machine according to claim 1, further comprising:
    means for storing discount products and nondiscount products; and
    means for determining which of the discount and non-discount products is selected;
    wherein said counting means counts the number of discount products alone, and said product sales price output means generates the discount price for only the discount products.

5. A machine according to any one of claims 1 to 3, wherein said second output generated by said product sales prices output means represents the common discount price for the respective types of discount products.

6. A machine according to any one of claims 1 to 3, wherein said second output generated by said product sales price output means represents different discount prices for the respective types of discount products.

* * * * *